United States Patent
Sumi et al.

(10) Patent No.: US 10,511,831 B2
(45) Date of Patent: Dec. 17, 2019

(54) DISPLAY DEVICE AND METHOD FOR DISPLAYING

(71) Applicant: Innolux Corporation, Miao-Li County (TW)

(72) Inventors: Naoki Sumi, Miao-Li County (TW); Pei-Hsuan Chiang, Miao-Li County (TW); Chiao-Fu Yu, Miao-Li County (TW); Wai-Lon Chan, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 215 days.

(21) Appl. No.: 15/398,010

(22) Filed: Jan. 4, 2017

(65) Prior Publication Data

US 2018/0192037 A1 Jul. 5, 2018

(51) Int. Cl.

| | |
|---|---|
| *H04N 13/00* | (2018.01) |
| *H04N 13/305* | (2018.01) |
| *G02B 27/22* | (2018.01) |
| *G09G 3/00* | (2006.01) |
| *H04N 13/351* | (2018.01) |
| *G02B 3/00* | (2006.01) |

(52) U.S. Cl.
CPC ....... *H04N 13/305* (2018.05); *G02B 27/2214* (2013.01); *G09G 3/003* (2013.01); *H04N 13/351* (2018.05); *G02B 3/0043* (2013.01); *G09G 2320/0285* (2013.01); *G09G 2320/068* (2013.01)

(58) Field of Classification Search
CPC .. H04N 13/305; H04N 13/351; H04N 13/106; H04N 13/376; G02B 27/2214

USPC ...................... 382/103; 348/15, 59; 359/463; 345/419; 349/15

See application file for complete search history.

(56) References Cited

U.S. PATENT DOCUMENTS

| | | | | |
|---|---|---|---|---|
| 3,660,919 A | * | 5/1972 | Nagel | G08B 5/00 40/437 |
| 7,589,898 B2 | | 9/2009 | Shigemura et al. | |
| 2009/0123030 A1 | * | 5/2009 | De La Barre | H04N 13/376 382/103 |

(Continued)

FOREIGN PATENT DOCUMENTS

| | | |
|---|---|---|
| CN | 102081249 A | 6/2011 |
| CN | 103118267 A | 5/2013 |
| CN | 104349156 A | 2/2015 |

OTHER PUBLICATIONS

CN Office Action dated Aug. 28, 2019 in Chinese application (No. 201711337910.9).

*Primary Examiner* — Gims S Philippe
(74) *Attorney, Agent, or Firm* — McClure, Qualey & Rodack, LLP

(57) ABSTRACT

The disclosure provides a 3D image display device. The 3D image display device includes a display module having multiple sub-pixels, a driving module, and an optical module disposed opposite to the display module. The driving module is electrically connected to the sub-pixels. The optical module provides a normal view zone and a reverse view zone. A plurality of view images are arranged in the normal view zone and the reverse view zone. The view images in the normal view zone are arranged in a forward order, the view images in the reverse view zone are arranged in a reverse order, and the width of the normal view zone is greater than the width of the reverse view zone.

12 Claims, 9 Drawing Sheets

(56) References Cited

U.S. PATENT DOCUMENTS

| | | |
|---|---|---|
| 2010/0172023 A1 | 7/2010 | Jung |
| 2011/0032339 A1 | 2/2011 | Hirayama et al. |
| 2011/0032346 A1* | 2/2011 | Kleinberger ......... H04N 13/305 |
| | | 348/59 |
| 2011/0157311 A1 | 6/2011 | Angot et al. |
| 2012/0062991 A1* | 3/2012 | Krijn .................... H04N 13/305 |
| | | 359/463 |
| 2013/0155377 A1 | 6/2013 | Huang |
| 2013/0335463 A1 | 12/2013 | Chiang et al. |
| 2015/0042770 A1 | 2/2015 | Barenbrug et al. |
| 2015/0049266 A1* | 2/2015 | Muller ............... G02B 27/2214 |
| | | 349/15 |
| 2015/0130793 A1* | 5/2015 | Han .................... H04N 13/351 |
| | | 345/419 |
| 2016/0198148 A1* | 7/2016 | Asai .................... H04N 13/376 |
| | | 348/59 |
| 2017/0094266 A1* | 3/2017 | Han .................... H04N 13/305 |
| 2017/0347083 A1* | 11/2017 | Grossmann .......... H04N 13/106 |

\* cited by examiner

DISPLAY DEVICE AND METHOD FOR DISPLAYING

TECHNICAL FIELD

The disclosure relates to display device, and more particularly to a 3D display device and driving method thereof.

BACKGROUND

Display panel has been widely used in a variety of electronic devices in modern technology, such as cellular phone, television, personal computer, and so on. In recent years, three dimensional (3D) display, particularly glassless 3D (naked-eye 3D, or auto-stereoscopic 3D), has become more and more popular. The technology used in the glassless 3D mainly includes lenticular lens display and parallax barrier display, both forming stereoscopic images by way of spatial distribution. For the lenticular lens display, the lenticular lens makes the light refracted and emitted at an angle, so that the left-eye image and the right-eye image are projected to the viewer's left eye and right eye respectively. For the parallax barrier display, the barrier areas and the transparent areas are formed according to the light shielding principles and are alternately arranged to form a grating, such that the images viewed by the viewer's left eye and right eye through the slit of the grating are the left-eye image and the right-eye image.

SUMMARY

The disclosure is directed to a 3D display device and a driving method for displaying a 3D image.

According to one aspect of the disclosure, a 3D image display device is provided. The 3D image display device includes a display module having multiple sub-pixels, a driving module, and an optical module disposed opposite to the display module. The driving module is electrically connected to the multiple sub-pixels. The optical module provides a normal view zone and a reverse view zone. A plurality of view images are arranged in the normal view zone and the reverse view zone. The view images in the normal view zone are arranged in a forward order, the view images in the reverse view zone are arranged in a reverse order, and the width of the normal view zone is greater than the width the reverse view zone.

According to another aspect of the disclosure, a method for displaying a 3D image is provided. The method includes the following steps. Provide a display module having multiple sub-pixels. Provide an optical module disposed opposite to the display module. Provide a normal view zone and a reverse view zone by the optical module. A plurality of view images are arranged in the normal view zone and the reverse view zone. The view images in the normal view zone are arranged in a forward order, the view images in the reverse view zone are arranged in a reverse order, and the width of the normal view zone is greater than the width of the reverse view zone.

The disclosure will become apparent from the following detailed description of the embodiments. The following description is made with reference to the accompanying drawings.

Figure 1:
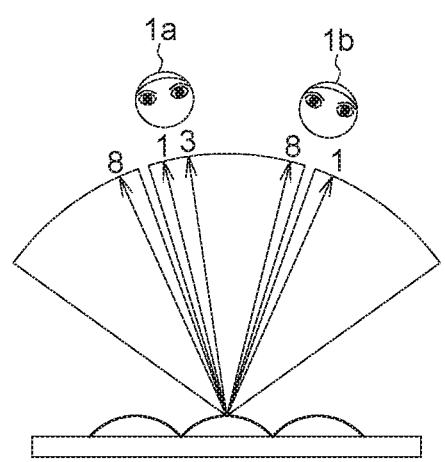
FIG. 1 shows a diagram of an example for view jump problem.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The glassless 3D display device using spatial distribution has predetermined viewing positions. If the viewer is not viewing the images from these predetermined viewing positions, the viewer may be unable to see stereoscopic effect. FIG. 1 shows a diagram of an example 3D image display device that causes the view jump problem. Lenticular lens is used as an example in FIG. 1 to provide 8-view naked-eye 3D display. When the viewer is located at position 1a, the left eye sees the $3^{rd}$ view image and the right eye sees the $1^{st}$ view image, and the parallax between the 3 view image and the $1^{st}$ view image is resulting in a normal stereoscopic image. However, when the viewer moves to position 1b, the left eye sees the $1^{st}$ view image while the right eye sees the $8^{th}$ view image, the stereoscopic image will experience reverse parallax and image jumping, causing discomfort to the viewer. There is a need for a 3D image display device to reduce such discomfort problem.

Figure 2:
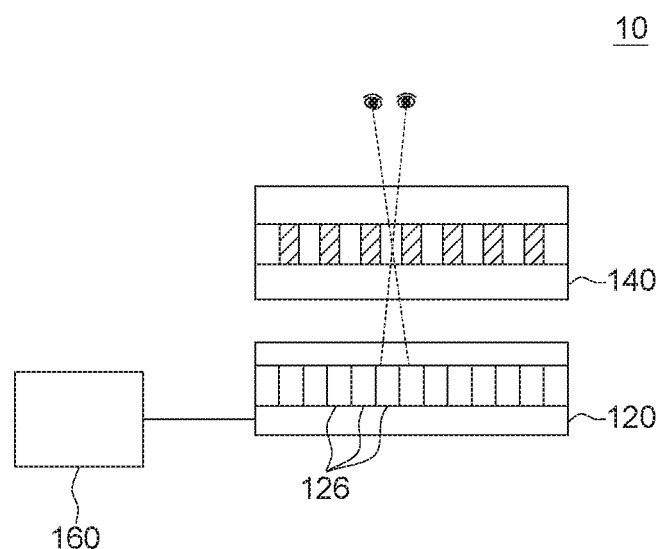
FIG. 2 shows a diagram of a 3D image display device according to an embodiment of the disclosure.
Figure 3:
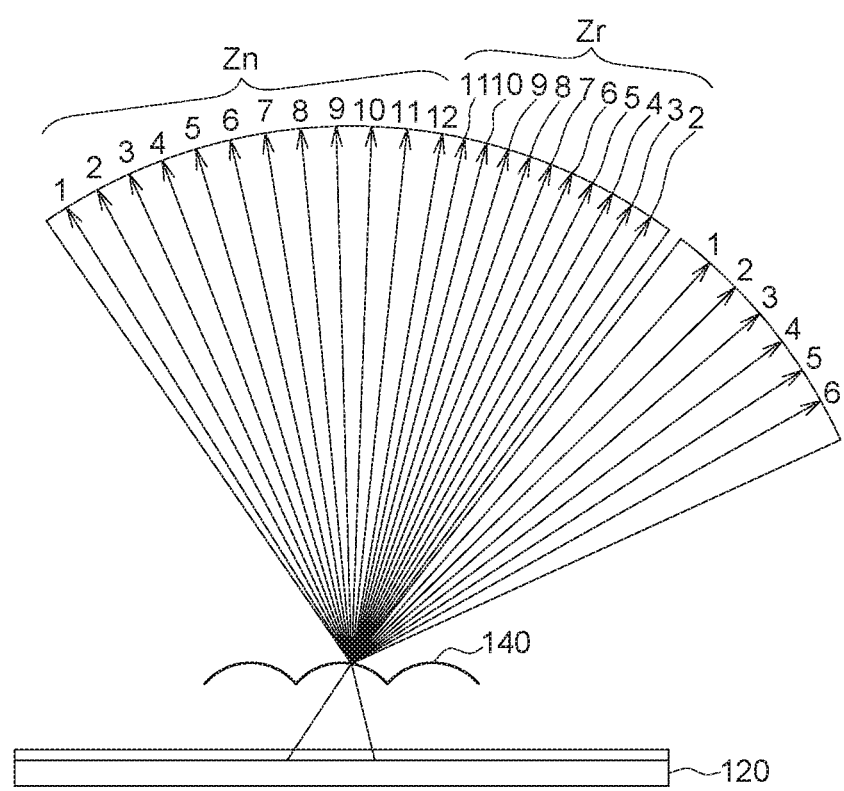
FIG. 3 shows a diagram showing a normal view zone and a reverse view zone according to an embodiment of the disclosure.

FIG. 2 and FIG. 3 shows diagrams of a 3D image display device according to an embodiment of the disclosure. The 3D image display device 10 includes a display module 120 having multiple sub-pixels 126, a driving module 160 is electrically connected to the display module 120, and an optical module 140 is disposed opposite to the display module 120. The driving module 160 is configured to set a view allocation table T, and base on the view allocation table T to drive the sub-pixels 126 accordingly. The view allocation table T may refer to the optical module 140 to allocate view data selected from N view images into a picture, where N is number of view images, and N is a positive integer greater than 1. The optical module 140 is configured to modulate the light propagation direction of view images from the sub-pixels 126 of the display module 120. The optical module 140 provides sequentially interlaced normal view zone Zn and reverse view zone Zr arrangement. A pair of normal view zone Zn and reverse view zone Zr are sequentially arranged. The view images in the normal view zone Zn are arranged in a forward order, the view images in the reverse view zone Zr are arranged in a reverse order, and divergence angle (spread angle) of the normal view zone Zn is greater than divergence angle (spread angle) of the reverse view zone Zr. The width of the normal view zone Zn is greater than the width of the reverse view zone Zr, the width is measured on a surface which is substantially parallel to the display module 120 and located at a distance from the optical module 140. The area of the normal view zone Zn is greater than the area of the reverse view zone Zr.

The display module 120 may be one of the following display module types: a liquid crystal display module (LCD), an organic light emitting diode display module (OLED) display, and a light emitting diode (LED) display module. Liquid crystal display module comprises a display panel and a backlight unit. The organic light emitting diode display module comprises a display panel. The light emitting diode display module comprises a display panel. The display panel of the display module 120 includes multiple pixels, and each pixel includes multiple sub-pixels 126. For example, one pixel may include three sub-pixels representing R(red), G(green), B(blue) components of a pixel value respectively. The display panel of the display module 120 may also include a plurality of thin film transistor, a plurality of circuit, a plurality of color filter pattern, a plurality of insulating layers, a plurality of electrodes, and so on (not shown in the figure to simplify drawing) to facilitate image display. For example, by adjusting voltage or current applied to the plurality of electrodes, different light intensity (brightness, or gray level) can be displayed from the plurality of sub-pixels 126.

The optical module 140 is disposed opposite to the display module 120 to create a 3D image. The optical module 140 could be disposed between the display module 120 and the observer, or the optical module 140 could be disposed between the display panel of the display module 120 and the backlight unit of the display module 120. The optical module 140 may include any of the following devices: a lenticular lens, a parallax barrier, a liquid crystal gradient index (LC GRIN) lens, and a liquid crystal (LC) parallax barrier. The optical module 140 may be states switchable for a 2D/3D switchable display device. For example, the optical module 140 may include several optical elements, and the state of the light passing through each optical element can be modulated to achieve grating effect. In one embodiment, the optical module 140 and the display module 120 are assembled together. The optical module 140 may distribute outgoing light rays of view images from sub-pixels 126 of the display module 120 in many view directions (viewing angles). Parallax barrier is illustrated in FIG. 2 as an example. The optical module 140 may include lenticular lens instead.

The driving module 160 may be electrically connected to the display module 120 to provide driving signals to the display module 120. The driving module 160 may be implemented by electric circuits and/or software units that allocate 3D view data into sub-pixels 126 to display 3D view images. The 3D image display device 10 is capable of displaying N view images (N>2). The driving module 160 is configured to provide a view allocation table T in which view data is selected and allocated to drive the sub-pixels 126 to output view images accordingly. For example, each entry in the view allocation table T may correspond to one sub-pixel 126 in the display module 120, and each entry in the view allocation table T may represent one of view data from the N view images. In one embodiment, the driving module 160 includes a storage device (such as read-only memory, flash memory, which is not shown in the figure) to store the view allocation table T. In another embodiment, the driving module 160 may further include a processing circuit (not shown in the figure) to dynamically calculate the view allocation table T.

To clearly illustrate the disclosure, 12 viewing images (N=12) and lenticular lens is used as an example in the following embodiment. However, it should be noted that N may also be other integer values greater than 1 and other types of optical module 140 may also be applicable. FIG. 3 shows a diagram showing a normal view zone and a reverse view zone according to an embodiment of the disclosure. Based on the view allocation table T provided by the driving module 160, the optical module 140 (shown as lenticular lens in FIG. 3) provides a serial interlaced arrangement of a normal view zone Zn and a reverse view zone Zr. In the normal view zone Zn, the view images are arranged in a forward order, shown as view images 1, 2, 3, . . . , 12 sorted in ascending order. In the reverse view zone Zr, the view images are arranged in a reverse order, shown as view images 11, 10, 9, . . . , 2 sorted in descending order. The normal view zone Zn is larger than the reverse view zone Zr. For example, the normal view zone Zn may have a lower density of view images, larger divergence angle (spread angle), larger width, larger area, and a wider view-to-view pitch (pitch of adjacent two view images), while the reverse view zone Zr may have a higher density of view images, smaller divergence angle (spread angle), smaller width, smaller area, and a narrower view-to-view pitch.

For example, if a viewer is located in the normal view zone Zn, the left eye sees the $8^{th}$ view image and the right eye sees the $6^{th}$ view image, a normal stereoscopic image is created. On the other hand, if a viewer is located in the reverse view zone Zr, the left eye sees the $4^{th}$ view image and the right eye sees the $8^{th}$ view image for example, the left-eye image and the right-eye image are reversed and hence a pseudo-stereoscopic image is created. Because the reverse view zone Zr is smaller than the normal view zone Zn, the probability that the viewer is located in the reverse view zone Zr is lower than in the normal view zone Zn, and therefore a wide 3D viewing angle can be achieved and also pseudo-stereoscopy is effectively reduced. Moreover, as can be seen in FIG. 3, the view images are changing in a continuous manner, either in forward order or in reverse order, and hence view jump problem which is illustrated in FIG. 1 will be obviously reduced.

Figure 4:
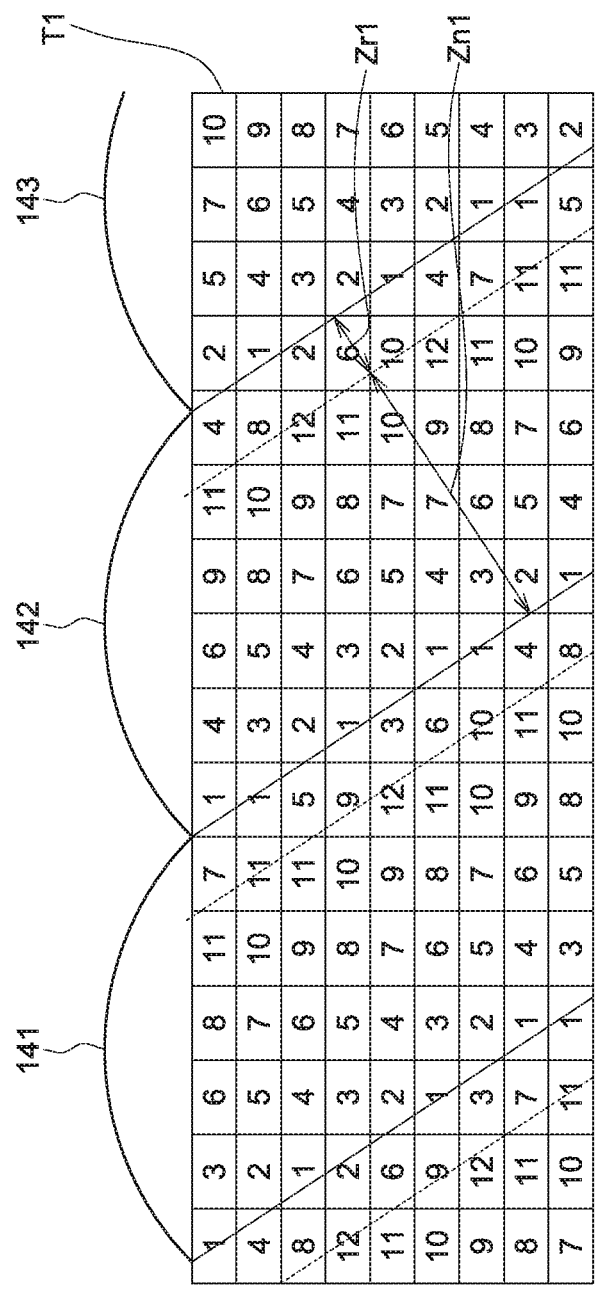
FIG. 4 shows an example view allocation table according to an embodiment of the disclosure.

FIG. 4 shows an example view allocation table according to an embodiment of the disclosure. The view allocation table T1 shown in FIG. 4 is provided and rendered by the driving module 160 to drive the display module 120, such that the optical module 140 provides interlaced arrangement of a normal view zone Zn1 and a reverse view zone Zr1. The arcs depicted on top and bottom of the view allocation table T1 in FIG. 4 represent the lenticular lenses. One lens covers about a positive integer number or a positive non-integer number of sub-pixels. The number shown in the view allocation table T1 represents the view image index (for example, 1 represents the $1^{st}$ view data from $1^{st}$ view image, 3 represents the $3^{rd}$ view data from $3^{rd}$ view image, and so on), and each entry in the view allocation table T1 corresponds to one sub-pixel of the display module 120 (for example, one row in the view allocation table T1 corresponds to one row of sub-pixels 126 in the display module 120, and one column in the view allocation table T1 corresponds to one column of sub-pixels 126 in the display module 120). The view allocation table T1 may be generated based on the size of the lenticular lens 141-143, such as lens width and curvature.

A total of twelve view images are allocated in the view allocation table T1. Note that for one row of the view allocation table T1, not all of the twelve view images are necessarily allocated in one lens because of the width limitation of the lens. As can be seen in the first row of the table T1, for the first lens 141, the view images 1, 3, 6, 8, 11 are allocated sequentially, forming a normal view zone, and then the view image 7 is allocated right after view image 11, forming a reverse view zone (reverse arrangement is view images 11, 7, 1). For the second lens 142, the view images 1, 4, 6, 9, 11 are allocated sequentially, forming a normal view zone, and then the view image 4 is allocated right after view image 11, forming a reverse view zone (reverse arrangement is view images 11, 4, 1). As can be seen in this example, by obtaining how many sub-pixels a lens covers, the view allocation table T1 may be generated according to the lens structure.

The view image allocation in the rows below is similar to the first row but slightly altered and also shifted to reflect the light characteristic through the lens. For example, view image allocation in the second low is right-shifted as compared to the first row, and the view images assigned in the second row are also different from those in the first row. As a result, the slant solid lines and the slant dotted lines in FIG. 4 depict the normal view zone Zn1 and the reverse view zone Zr1 provided by the optical module 140 according to this view allocation table T1. The area of the normal view zone Zn1 and the area of the reverse view zone Zr1 may be represented by distance between the slant solid line and the slant dotted line. It can be seen that divergence angle, width, and area of reverse view zone Zr1 is less than divergence angle, width, and area of the normal view zone Zn1.

In the example shown in FIG. 4, a combination of one normal view zone Zn1 and one reverse view zone Zr1 is a view zone period. The width of the reverse view zone Zr occupies about 20% of the total width of the view zone period (Zn+Zr). A ratio of the width of the reverse view zone Zr over the sum of the width of the normal view zone Zn and the width of the reverse view zone Zr is about 20%. In one embodiment, the width of the reverse view zone Zr ranges from 10%-40% of the total width of the view zone period. A ratio of the width of the reverse view zone Zr over the sum of the width of the normal view zone Zn and the width of the reverse view zone Zr is ranging from 10%-40%. In implementation, the ratio of the reverse view zone area to the total width of view zone period may be set to below 30%, such as 20%-30%, to reduce pseudo-stereoscopic effect. A ratio of the width of the reverse view zone Zr over the sum of the width of the normal view zone Zn and the width of the reverse view zone Zr is ranging from 20%-30%.

Figure 5:
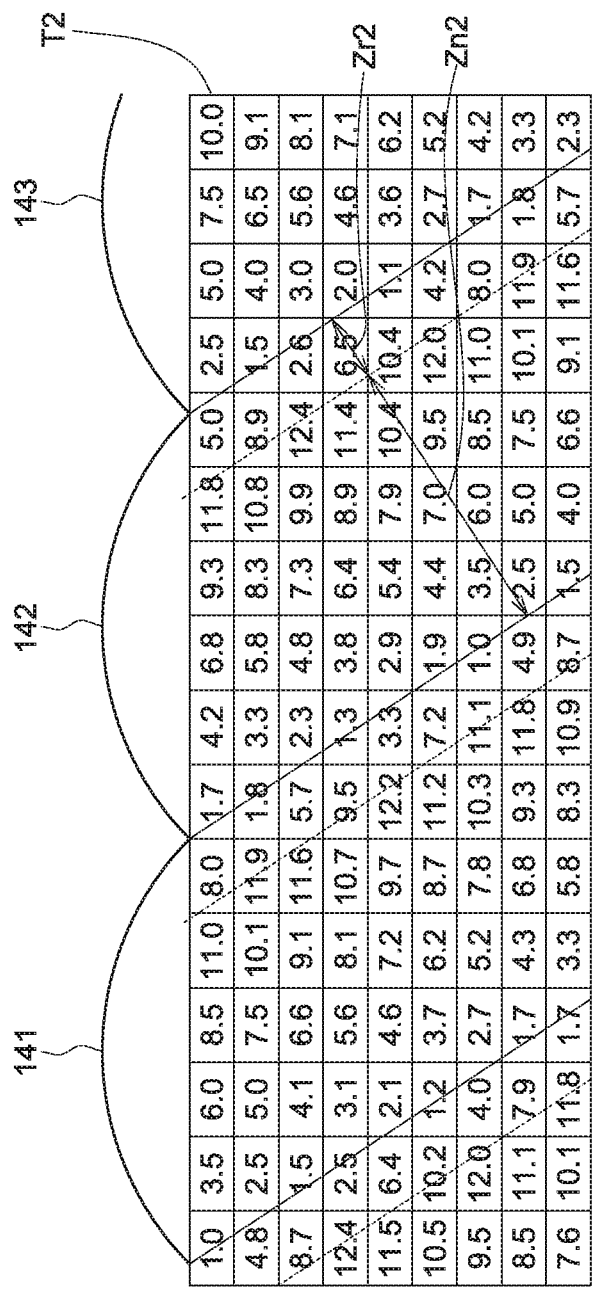
FIG. 5 shows an example view allocation table using interpolation according to an embodiment of the disclosure.

FIG. 5 shows an example view allocation table using interpolation according to an embodiment of the disclosure. In this embodiment, interpolation is used to provide a view allocation table T2 with non-integer values. Intermediate image data of adjacent two view data is calculated by interpolation and weighting factors. For example, in the view allocation table T2, 1.3 represents 0.7 times of the $1^{st}$ view data plus 0.3 times of the $2^{nd}$ view data, and 3.8 represents 0.2 times of the $3^{rd}$ view data plus 0.8 times of the $4^{th}$ view data. In one embodiment, a part of the view allocation table T2 may use original (non-interpolated) image data (using integer values), and a part of the view allocation table T2 may use interpolated image data (using non-integer values). That is, at least one entry of the view allocation table T2 is an interpolation of two of the N view data (view image). Similarly, width and area of the normal view zone Zn2 is greater than width and area of the reverse view zone Zr2.

Figure 6:
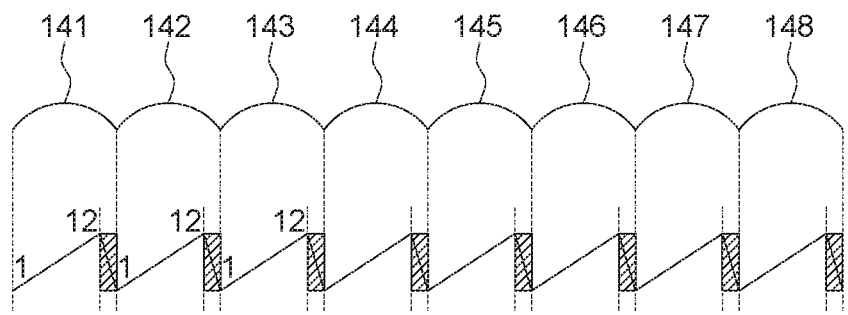
FIG. 6 shows a diagram illustrating alternating positions of multiple normal view zones and reverse view zones according to an embodiment of the disclosure.

FIG. 6 shows a diagram illustrating alternating positions of multiple normal view zones and reverse view zones according to an embodiment of the disclosure. Multiple lenticular lenses 141-148 are shown in FIG. 6. Referring to the view allocation table T1 and T2 shown in FIG. 4 and FIG. 5, each lenticular lens 141-148 is configured to provide an individual normal view zone and an individual reverse view zone. According to the regular view arrangement in the view allocation table T1 and T2, each individual normal view zone and each individual reverse view zone appears corresponding to the same position of each lenticular lens 141-148, for example, near the edge of each lenticular lens 141-148. The bottom triangular wave shown in FIG. 6 represents a trend of the view image index. In this example, the view image index increases relatively slowly from 1 to 12 in the normal view zone, and the view image index drops relatively rapidly from 12 to 1 in the reverse view zone (shown as shaded areas), which appears near the edge of the lenticular lens 141-148.

Figure 7:
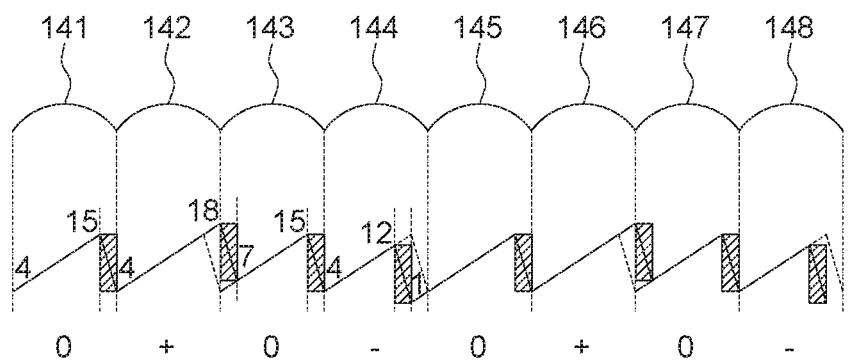
FIG. 7 shows a diagram illustrating alternating positions of multiple normal view zones and reverse view zones according to an embodiment of the disclosure.

In the embodiment shown in FIG. 6, the individual reverse view zone appears corresponding to the same position of each lenticular lens. Such regularity may cause the viewer suffer from severe pseudo-stereoscopic effect in specific regions. In one embodiment, such regularity is perturbed to overcome this problem. FIG. 7 shows a diagram illustrating alternating positions of multiple normal view zones and reverse view zones according to an embodiment of the disclosure. N=18 in this embodiment. In the first lens 141, the view image index increases from 4 to 15 in the normal view zone, and the view image index drops from 15 to 4 in the reverse view zone (shown as shaded area). In the second lens 142, the view image index increases from 4 to 18 in the normal view zone (larger than in the first lens 141), and the view image index drops from 18 to 7 in the reverse view zone, resulting in a right-shifted reverse view zone. In the third lens 143, the view image index increases from 7 to 15 in the normal view zone, and the view image index drops from 15 to 4 in the reverse view zone, recovering the reverse view zone to the zero-offset position. In the fourth lens 144, the view image index increases from 4 to 12 in the normal view zone (smaller than in the first lens 141), and the view image index drops from 12 to 1 in the reverse view zone, resulting in a left-shifted reverse view zone.

In the embodiment shown in FIG. 7, reverse view zones with different widths are corresponding to different position of lenticular lenses. This configuration may be achieved by designing a corresponding view allocation table T. By introducing such perturbation into the relative positions of the reverse view zones, the pseudo-stereoscopic effect can be effectively dispersed and randomized in space, hence suppressing the viewing stress for the viewer.

In one embodiment, there is a periodic swing in a position offset of each individual reverse view zone relative to each lenticular lens. As shown in FIG. 7, the position offset of the reverse view zone for the first lens 141 is 0 (represented as '0' in FIG. 7). The position offset of the reverse view zone for the second lens 142 is a positive value (right shifted, represented as '+' in FIG. 7). The position offset of the reverse view zone for the fourth lens 144 is a negative value (left shifted, represented as '−' in FIG. 7). The position offset of each individual reverse view zone relative to each lenticular lens exhibits a periodic pattern {0, +, 0, −, 0, +, 0, −, . . . }. In another embodiment, the position offset of each individual reverse view zone may be randomized, without forming a periodic pattern.

Figure 8:
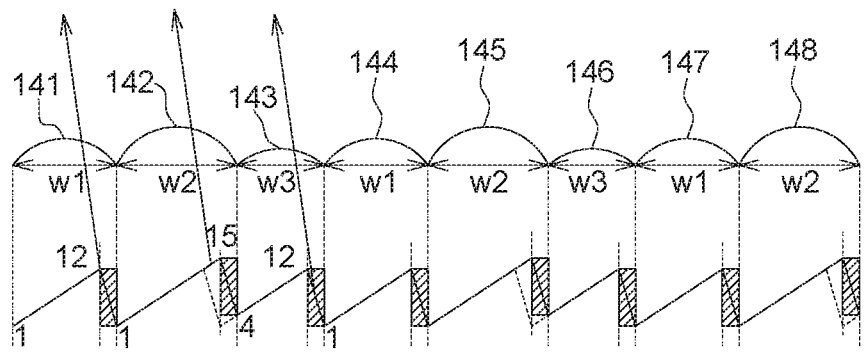
FIG. 8 shows a diagram illustrating alternating widths of multiple lenticular lenses according to an embodiment of the disclosure.

FIG. 8 shows a diagram illustrating alternating widths of multiple lenticular lenses according to an embodiment of the disclosure. In this embodiment, the optical module 140 includes multiple lenticular lenses 141-148, with two neighboring lenticular lenses (such as lens pair 141 and 142, or lens pair 142 and 143) have different widths. The view allocation table T is created according to the widths of the lenticular lenses 141-148. The width of each lens 141, 142, 143, 144, 145, 146, 147, 148 is for example w1, w2, w3, w1, w2, w3, w1, w2, respectively. The width w3 is smaller than the width w1, and the width w1 is smaller than the width w2. Based on the lens structure, the view allocation table T may be created accordingly. For a normal width w1, the view images 1-12 may be arranged in the normal view zone. For a wide width w2, the view images 1-15 may be arranged in the normal view zone. For a narrow width w3, the view images 4-12 may be arranged in the normal view zone. In other words, more view images are allocated for a wider lens, and fewer view images are allocated for a narrower lens in the view allocation table T. As shown in FIG. 8, a vision of the viewer is represented by three parallel arrows. In this embodiment the viewer sees a mix result, consisting of both a normal view and a reverse view. In other words, the pseudo-stereoscopic effect can be effectively dispersed and randomized in space, without being concentrated at a particular location, and hence suppressing the viewing stress for the viewer.

In one embodiment, there is a periodic swing in the width of each lenticular lens. As the example shown in FIG. 8, the width of the lens 141-148 are w1, w2, w3, w1, w2, w3, w1, w2, which constitutes a periodic pattern. In another embodiment, the width of the lens 141-148 may be randomized, without forming a periodic pattern. The view allocation table T is then created based on the widths of the lens 141-148. By setting an appropriate view allocation table T according to the lens structure, each individual reverse view zone may appear corresponding to the same position relative to each lenticular lens, for example, near the edge of each lenticular lens 141-148.

Figure 9:
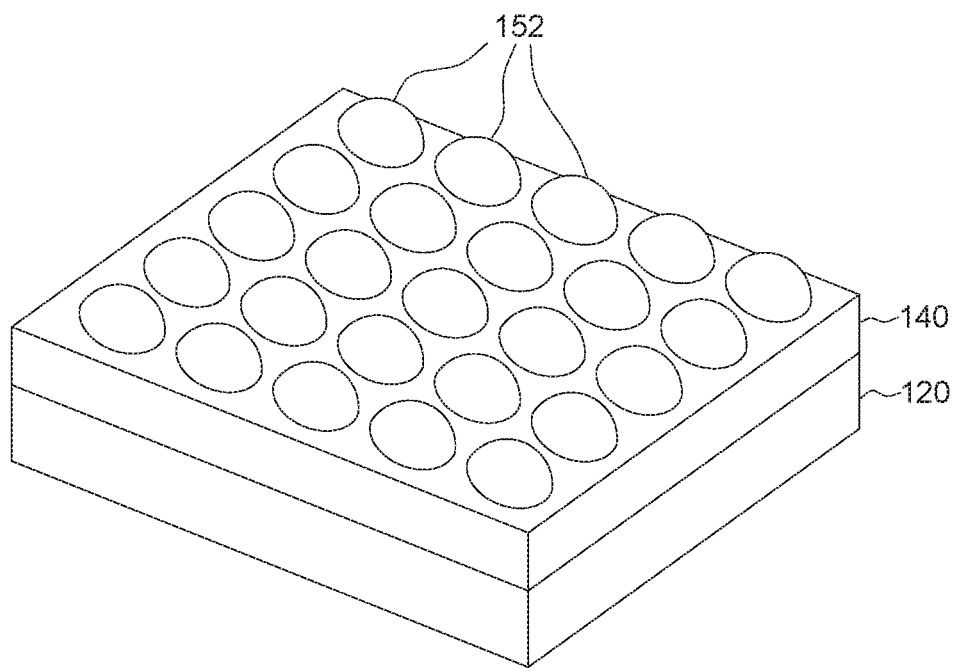
FIG. 9 shows a diagram of a 3D image display device including a micro lens array according to an embodiment of the disclosure.

In one embodiment, the optical module 140 may include at least one of the following devices: a micro lens array and a parallax apertures array. These array structures allow a 3D image to be displayed in both horizontal direction and vertical direction. Although micro lens array is used an example in the following description, parallax apertures array may also be applicable. FIG. 9 shows a diagram of a 3D image display device including a micro lens array according to an embodiment of the disclosure. The optical module 140 in this embodiment includes multiple micro lenses 152, where each micro lens may correspond to one or more pixel or sub-pixel of the display module 120. The above mentioned technique, for generating a normal view zone and a reverse view zone according to a view allocation table, may be applied to both horizontal direction and vertical direction for landscape view or portrait view.

Figure 10:
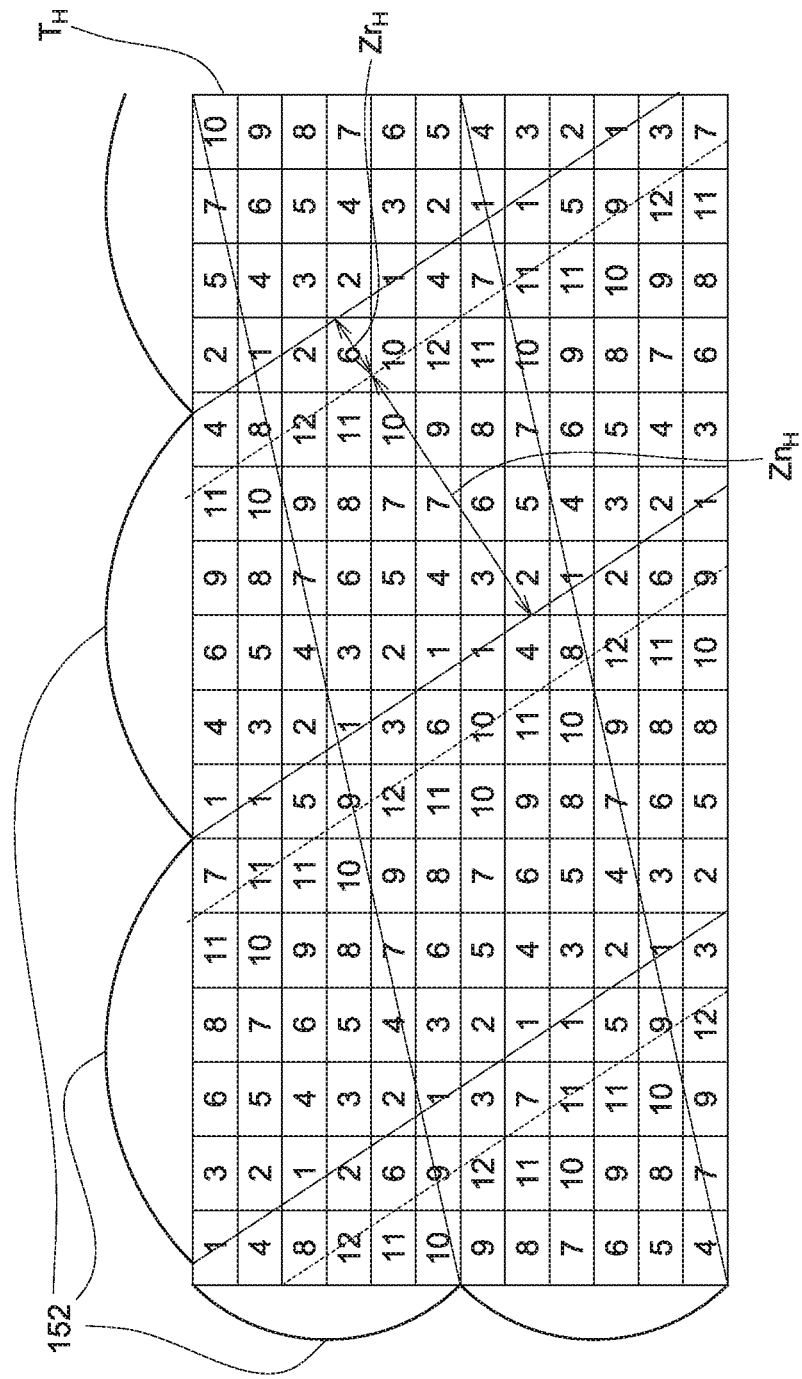
FIG. 10 shows an example horizontal view allocation table according to an embodiment of the disclosure.
Figure 11:
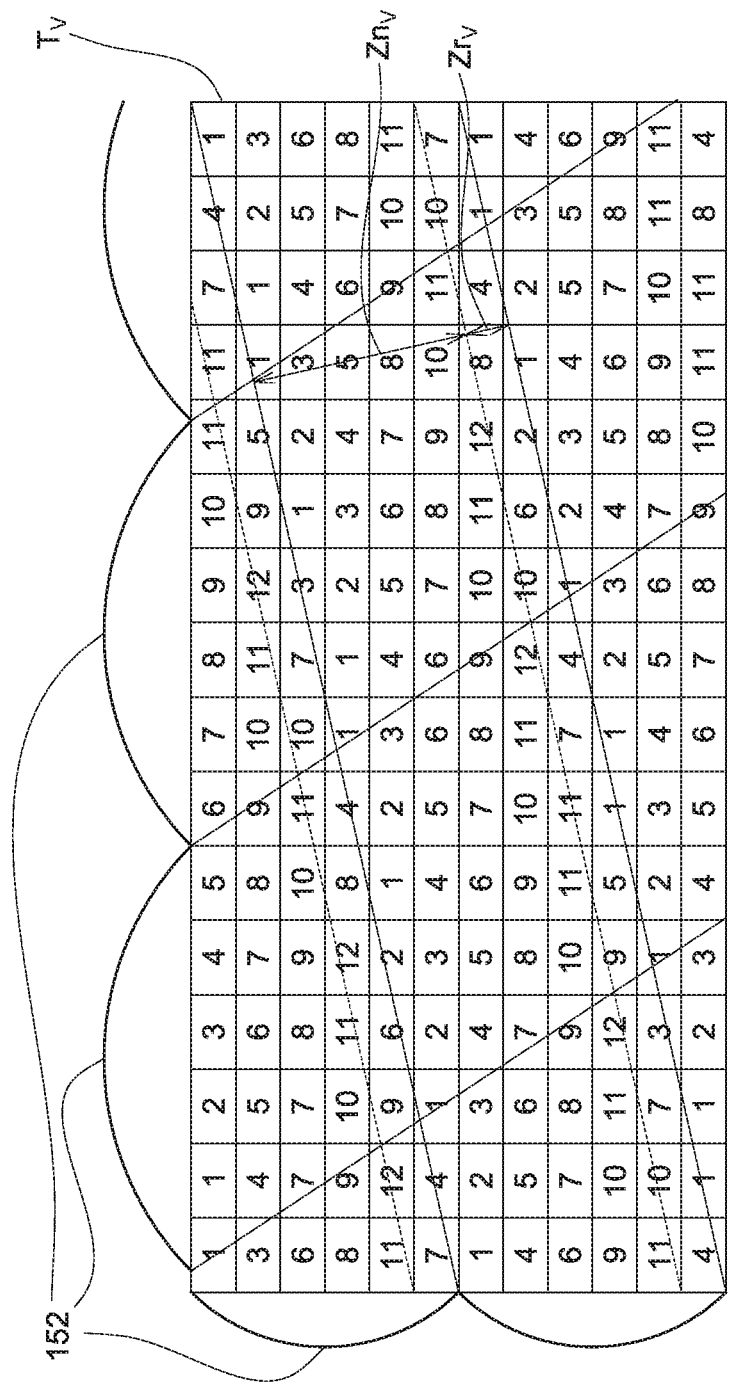
FIG. 11 shows an example vertical view allocation table according to an embodiment of the disclosure.

The view allocation table T may include a horizontal view allocation table $T_H$ and a vertical view allocation table $T_V$ in this example. FIG. 10 shows an example horizontal view allocation table $T_H$ according to an embodiment of the disclosure. FIG. 11 shows an example vertical view allocation table $T_V$ according to an embodiment of the disclosure. The arcs depicted on top and left of the view allocation tables $T_H$ and $T_V$ represent the micro lenses 152. Each sub-pixel has one or two view data input for horizontal view or vertical view. The optical module 140, including multiple micro lenses 152, is configured to modulate a wider horizontal normal view zone $Zn_H$ and a narrow horizontal reverse view zone $Zr_H$ according to the horizontal view allocation table $T_H$, as shown in FIG. 10. The optical module 140 is also configured to modulate a wider vertical normal view zone $Zn_V$ and a narrow vertical reverse view zone $Zr_V$ according to the vertical view allocation table $T_V$, as shown in FIG. 11.

Figure 12:
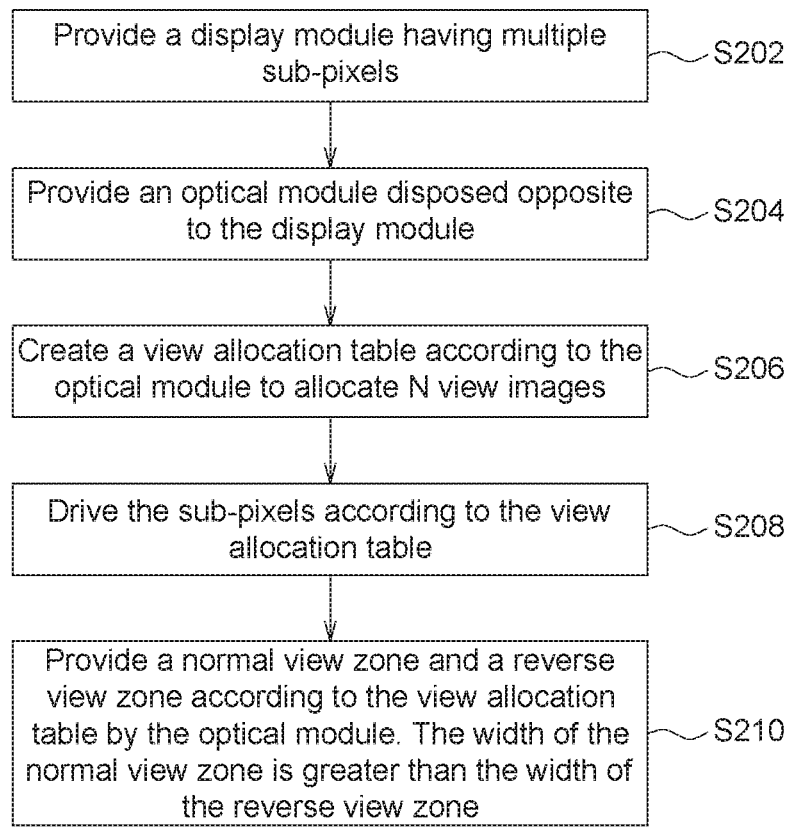
FIG. 12 shows a flowchart illustrating a method for displaying a 3D image according to an embodiment of the disclosure.

In one embodiment, a method for displaying a 3D image is provided. FIG. 12 shows a flowchart illustrating a method for displaying a 3D image according to an embodiment of the disclosure. The method includes the following steps. Step S202: Provide a display module having multiple sub-pixels, such as the display module 120 described in the above embodiments. Step S204: Provide an optical module disposed opposite to the display module, such as the optical module 140 described in the above embodiments. Step S206: Create a view allocation table according to the optical module to allocate N view images, where N is a number of view angles and is a positive integer greater than 1. The view allocation table may be referred to examples shown in FIG. 4, FIG. 5, FIG. 10 and FIG. 11. Step S208: Drive the sub-pixels according to the view allocation table. The step S208 may be performed by a driving module, such as the driving module 160 described in the above embodiments. Step S210: Provide a normal view zone and a reverse view zone according to the view allocation table by the optical module. The view images in the normal view zone are arranged in a forward order, and the view images in the reverse view zone are arranged in a reverse order. The width of normal view zone is greater than the width of reverse view zone.

According to the 3D image display device and method disclosed herein, because the view allocation table arranges a wider normal view zone and a narrower reverse view zone, wider viewing angle performance and less pseudo-stereoscopic effect can be achieved. In addition, the view jump problem is obviously reduced. The 3D image display device and method disclosed in the above embodiments may be applied to auto-stereoscopy technologies, including lenticular lens, parallax barrier, micro lens array, and parallax pinhole array, and also may be applied to various display technologies, including LCD panel, OLED display and LED display. Moreover, in some embodiments, the image pitch (such as the example shown in FIG. 7) and/or the lens pitch (such as the example shown in FIG. 8) may be modulated to introduce perturbation in the regular arrangement, such that the pseudo-stereoscopic effect can be mitigated.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A display device, comprising:
  a display module, comprising a plurality of sub-pixels;
  a driving module, electrically connected to the plurality of sub-pixels to supply driving signals to the plurality of sub-pixels; and an optical module, disposed opposite to the display module and corresponding to the plurality of sub-pixels, wherein the optical module provides a first normal view zone and a first reverse view zone, and a plurality of view images provided by the plurality of sub-pixels are arranged in the first normal view zone and the first reverse view zone, wherein the plurality of view images in the first normal view zone are arranged in a forward order, the plurality of view images in the first reverse view zone are arranged in a reverse order, wherein the first normal view zone has a first width, the first reverse view zone has a second width, and the first width is greater than the second width, wherein the optical module comprises a plurality of lenticular lenses, the optical module provides a second reverse view zone, and the first reverse view zone and the second reverse view zone are corresponding to different portions of two adjacent of the lenticular lens.

2. The image display device according to claim 1, wherein the driving module provides a view allocation table to drive the plurality of sub-pixels, wherein the view allocation table includes N view images, and N is a positive integer greater than 1.

3. The display device according to claim 2, wherein at least one entry of the view allocation table is an interpolation of two of the N view images.

4. The display device according to claim 1, wherein a ratio of the second width over a sum of the first width and the second width is ranging from 10%-40%.

5. The display device according to claim 4, wherein the ratio of the second width over the sum of the first width and the second width is ranging from 20%-30%.

6. The display device according to claim 1, wherein at least two of the lenticular lenses have different widths.

7. A method for driving a display device, comprising:
providing a display module having a plurality of sub-pixels;
providing a driving module electrically connected to the plurality of sub-pixels to supply driving signals to the plurality of sub-pixels;
providing an optical module disposed opposite to the display module and corresponding to the plurality of sub-pixels; and
providing a first normal view zone and a first reverse view zone by the optical module, and a plurality of view images provided by the plurality of sub-pixels are arranged in the first normal view zone and the first reverse view zone, wherein the plurality of view images in the first normal view zone are arranged in a forward order, the plurality of view images in the first reverse view zone are arranged in a reverse order, and the first normal view zone has a first width, the first reverse view zone has a second width, and the first width is greater than the second width, wherein the optical module comprises a plurality of lenticular lenses, the optical module provides a second reverse view zone, and the first reverse view zone and the second reverse view zone are corresponding to different portions of two adjacent of the lenticular lens.

8. The method according to claim 7, further comprising creating a view allocation table to allocate N view images by a driving module, and driving the plurality of sub-pixels according to the view allocation table by the driving module, where N is a number of view images, and N is a positive integer greater than 1.

9. The method according to claim 8, wherein at least one entry of the view allocation table is an interpolation of two of the N view images.

10. The method according to claim 7, wherein a ratio of the second width over a sum of the first width and the second width is ranging from 10%-40%.

11. The method according to claim 10, wherein the ratio of the second width over the sum of the first width and the second width is ranging from 20%-30%.

12. The method according to claim 7, wherein at least two of the lenticular lenses have different widths.

* * * * *